(No Model.)

J. THOMSON.
DIFFERENTIAL GEARING AND THE APPLICATION THEREOF TO WATER METERS.

No. 452,490. Patented May 19, 1891.

Witnesses
Geo. W. Breck.
C. E. Ashley

Inventor:
John Thomson

UNITED STATES PATENT OFFICE.

JOHN THOMSON, OF BROOKLYN, ASSIGNOR TO THE THOMSON METER COMPANY, OF NEW YORK, N. Y.

DIFFERENTIAL GEARING AND THE APPLICATION THEREOF TO WATER-METERS.

SPECIFICATION forming part of Letters Patent No. 452,490, dated May 19, 1891.

Application filed January 3, 1891. Serial No. 376,665. (No model.)

*To all whom it may concern:*

Be it known that I, JOHN THOMSON, a citizen of the United States, residing at Brooklyn, Kings county, New York, have invented certain new and useful Improvements in Differential Gearing and the Application Thereof to Water-Meters, of which the following is a specification.

This invention relates to differential gearing and its application to water-meters, fully set forth hereinafter, and illustrated in the accompanying drawings, in which—

Figure 1:
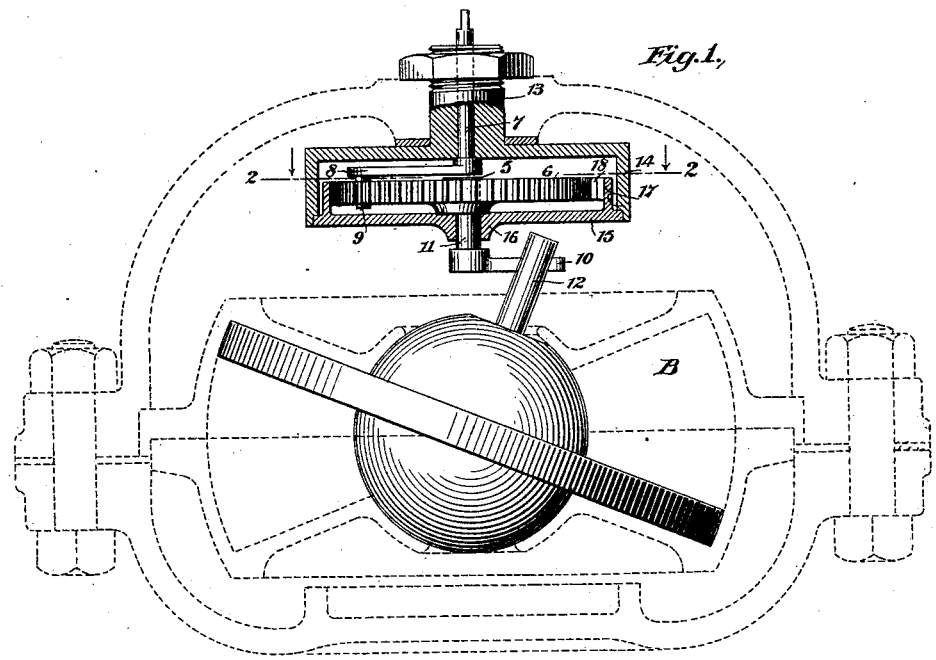
Figure 2:
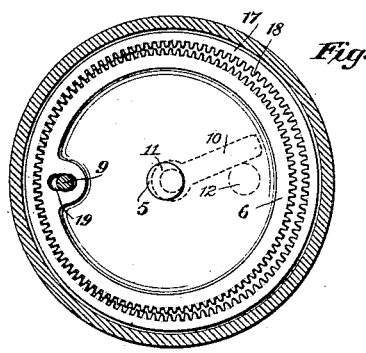

Figure 1 indicates a water-meter having my device applied thereto, shown in vertical center section and elevation. Fig. 2 is a top plan view of the gearing, and Figs. 3 and 4 show detail modifications thereof.

The object of this invention is to produce a gear-train of the minimum number of parts which shall be compact and durable, cheap to construct, and as a whole particularly applicable to water-meters as internal-speed-reducing gear-trains between the primary motion and the stuffing-box spindle. The train to which motion is imparted consists of but three parts—the driving-eccentric 5, the driven gear, as 6, and the stuffing-box spindle 7, which latter is connected to the driven gear by an arm 8 and stud 9; but, as will hereinafter be pointed out, this condition may be reversed. The driving-arm 10 is fast to the shaft 11, which is a part of the eccentric and may derive its motion in any manner—as, for instance, by means of the spindle 12 of the disk action B. The stuffing-box 13 is formed as a part of the cylindrical casing 14, which is inclosed by a plate 15, and provides a bearing 16 for the shaft of the eccentric. Upon the inner surface of the inclosing plate is a circular rib 17, in which are formed gear-teeth 18, in number, say, one hundred and one. The plate is rigidly attached to the casing. Hence the rib just described is in fact an external-gear wheel, in this instance fixed. The internal or driven gear 6 is of lesser diameter, provided with, say, one hundred teeth, and is freely mounted upon the eccentric, the throw of which is such as to constantly maintain the teeth of the two gears in proper relative mesh. Hence one complete rotation of the eccentric will bring all the teeth of both gears into engagement, resulting in the differential or secondary revolution of the internal gear equal to the difference of the number of teeth—that is, one hundred and one minus one hundred equals one tooth, and one one-hundredth equals one one-hundredth of a revolution upon the eccentric as an axis. It is this secondary or differential function of the gear that is here utilized, being directly accomplished by adapting the stud 9 of the stuffing-box-spindle arm to the slot 19 of the internal gear. This slot or its equivalent is necessary to permit the sliding or reciprocating movement of the gear upon the stud, which takes place twice at each rotation of the eccentric. In this wise I realize at once the relation of one hundred rotations of the eccentric to one revolution of the stuffing-box spindle.

Figure 3:
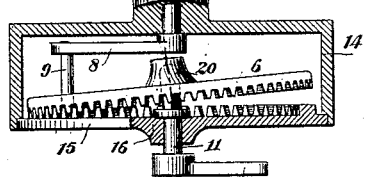

As shown in Fig. 3, the differential action may be produced by nearly the same combination of elements, but wherein the driven gear 6 is oscillated by the rotation of a stud 20, whose axis 21 is inclined from that of the driving-shaft. In this arrangement each complete revolution of the stud 20 brings all the teeth of both gears into engagement, resulting in the differential transmission to the stuffing-box spindle, as in the instance first described.

Figure 4:
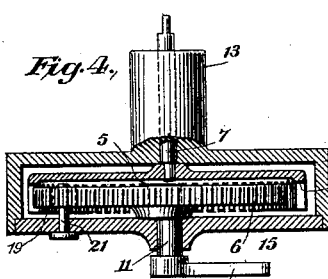

As before stated, the foregoing conditions of operation may be reversed and still employ the same number of moving parts, an illustration of which is shown in Fig. 4. In this instance the driven gear 6, loosely mounted upon the eccentric, as in Fig. 1, is prevented from revolving upon the eccentric by means of the pin 21, fast in the plate, which projects up through the slot 19 in the gear. Thus while the driven gear is free to be thrown by the eccentric it is prevented from turning upon its axis. The separate internal gear 17 is attached to the stuffing-box spindle. Now the consequence of this is that the secondary or differential motion, due to the difference in the number of teeth in the driven and the external gears, is at once communicated to the spindle, as before; but the medium in this instance is that of the teeth of the gear instead of the stud and arm.

In other words, the fixed pin, Fig. 4, takes the place of the fixed gear in Figs. 1, 2, and 3. The same reversion of operation may be made in Fig. 3.

I claim—

The combination, with the spindle carrying an eccentric, of a gear-wheel mounted upon the eccentric, a second gear-wheel meshing with the first, the two gear-wheels having an unequal number of teeth, a stuffing-box, a spindle mounted in the stuffing-box, and an arm connecting the spindle with the second gear-wheel, substantially as described.

In testimony whereof I have signed my name to this specification in the presence of two subscribing witnesses.

JOHN THOMSON.

Witnesses:
FRANK LAMBERT,
EDWD. K. ANDERTON.